United States Patent [19]

Tokuda et al.

[11] 4,414,569

[45] Nov. 8, 1983

[54] TRANSISTOR CIRCUIT

[75] Inventors: Kazuo Tokuda; Tokio Sawataishi, both of Tokyo, Japan

[73] Assignee: Nippon Electric Co., Ltd., Tokyo, Japan

[21] Appl. No.: 339,225

[22] Filed: Jan. 13, 1982

[30] Foreign Application Priority Data

Jan. 14, 1981 [JP] Japan ............................. 56-4264

[51] Int. Cl.³ .............................................. H04N 5/08
[52] U.S. Cl. .................................... 358/153; 328/139
[58] Field of Search .................... 358/148, 153, 154; 328/139, 115, 116

[56] References Cited

U.S. PATENT DOCUMENTS

| | | | |
|---|---|---|---|
| 3,629,501 | 12/1971 | Cense | 358/154 |
| 3,858,003 | 12/1974 | Scoubis | 358/153 |
| 3,879,576 | 4/1975 | Okada | 358/153 |
| 3,903,365 | 9/1975 | Arai | 358/153 |
| 4,027,178 | 5/1977 | Larner | 328/139 |
| 4,185,299 | 1/1980 | Harford | 358/153 |
| 4,289,981 | 9/1981 | Sakamoto | 328/139 |

*Primary Examiner*—Michael A. Masinick
*Attorney, Agent, or Firm*—Sughrue, Mion, Zinn, Macpeak and Seas

[57] ABSTRACT

The present invention provides a transistor circuit suited for a synchronizing signal separator. More particularly, the transistor circuit can separate the noise-free synchronizing signal from a composite video signal.

The transistor circuit comprises a transistor having an emitter coupled to an input terminal through a capacitor and to a constant current source, a base applied with a bias voltage and a collector connected to an output terminal, a comparator comparing the emitter voltage with a reference voltage, and means for turning the transistor off in response to the comparator output. A current charging circuit is preferably added.

17 Claims, 6 Drawing Figures

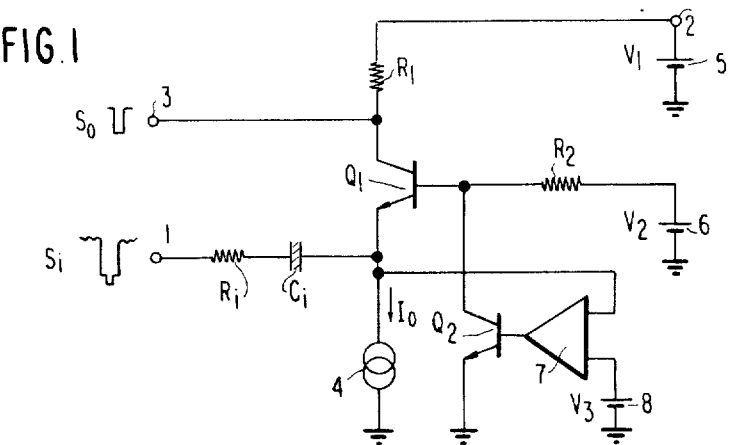
FIG.1
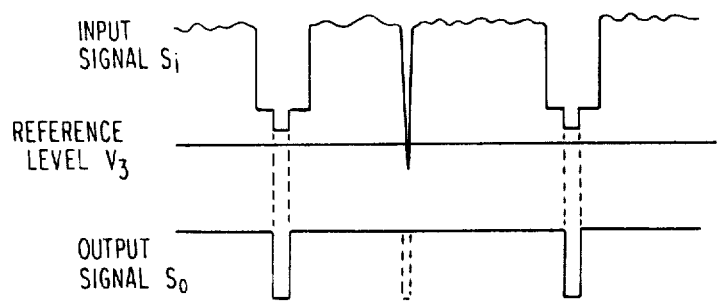
FIG.2
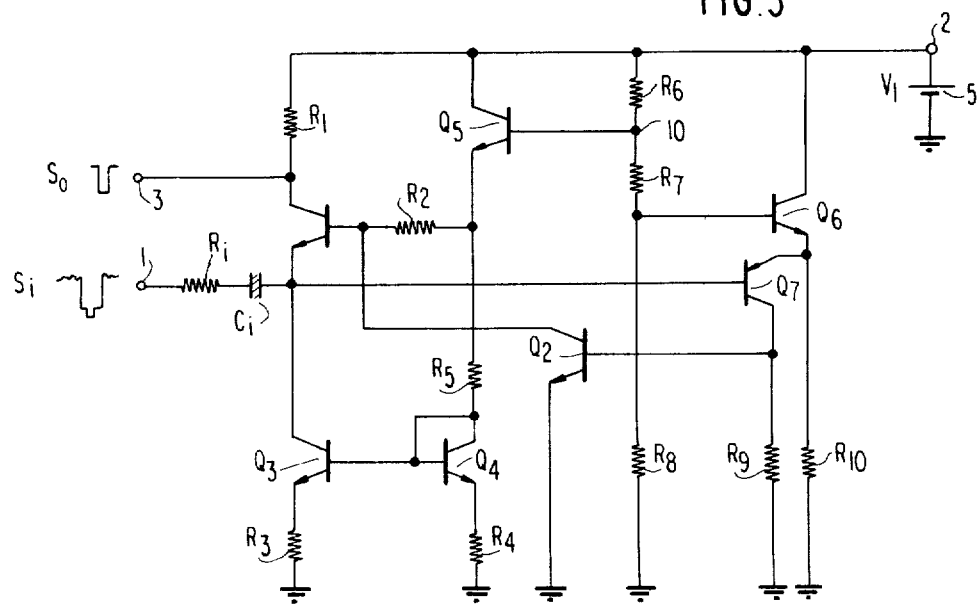
FIG.3
FIG.4

TRANSISTOR CIRCUIT

BACKGROUND OF THE INVENTION

The present invention relates to synchronizing signal separator circuits, and more particularly to a transistor circuit for preventing a synchronizing signal separating circuit from deriving an output in response to a noise pulse contained in a composite video signal.

A synchronizing signal separating circuit in a television set or the like separates a synchronizing signal from a composite video signal which contains a video information signal and the synchronizing signal. Though various types of synchronizing signal separating circuits have been heretofore proposed, the synchronizing signal separating circuit disclosed in U.S. Pat. No. 3,879,576 issued on Apr. 22, 1975 can achieve a preferable separating operation irrespective of the DC level change of the composite video signal due to variation of the electric field strength or the amplitude of the video information signal. This known circuit comprises a transistor for signal separation, a capacitor and a constant-current source. The composite video signal is applied via the capacitor to the emitter of the separating transistor. The emitter of the transistor is further connected to the constant-current source. A bias voltage is applied to the base of the transistor and an output is derived from its collector. Accordingly, during the synchronizing signal period in the composite video signal, the transistor is made conductive and charges the capacitor so that the synchronizing signal is outputted from the transistor. During the subsequent video information signal period, the transistor becomes non-conductive, and the electric charges in the capacitor are discharged by the constant-current source. In this process, the total charged quantity and the total discharged quantity of electric charges of the capacitor in one cycle of the composite video signal are made equal to each other. In addition, the charging current to the capacitor is chosen sufficiently larger than the discharging current. By making such provision, the transistor is made conductive only during the synchronizing signal period to fix the peak potential level of the synchronizing signal substantially to the voltage level obtained by subtracting the base-emitter voltage of the transistor from its bias voltage. At this time, the emitter bias voltage of the transistor is not charged by the input composite video signal. As a result, the transistor is made conductive only during the synchronizing signal period. Thus, there is provided a synchronizing signal separating circuit which can achieve a correct synchronizing signal separating operation without being influenced by the DC level change of the composite video signal due to the variation of the electric field strength or the amplitude of the video information signal.

However, if a noise pulse having larger amplitude than that of the synchronizing signal is contained in the composite video signal, the transistor for separating the synchronizing signal would respond to this noise pulse to generate the noise output other than the synchronizing signal output. This noise output would cause the disturbance in the vertical synchronization and malfunction of the AFC (automatic frequency control).

SUMMARY OF THE INVENTION

It is therefore one object of the present invention to provide a transistor circuit suitable for a noise elimination circuit, which prevents the above-mentioned type of synchronizing signal separating circuit from deriving an output other than a synchronizing pulse.

Another object of the present invention is to provide a transistor circuit suitable for a synchronizing signal separating circuit associated with a noise elimination circuit, which is constituted by a small number of circuit elements and is adapted for a monolithic integrated circuit.

The transistor circuit according to the present invention performs functions of, comparing the emitter voltage of the separating transistor for synchronizing signal separation with a predetermined reference voltage, and turning the separating transistor off in response to the result of the comparison. More particularly, the separating transistor has a base electrode supplied with a bias voltage, an emitter electrode connected to a constant current source and also applied with a composite video signal via a capacitor, and a collector electrode from which a synchronizing pulse is derived. The emitter voltage of the separating transistor is compared with the reference voltage by a comparator. If the comparator produces an output showing that a noise appears at the emitter of the separating transistor, the separating transistor is brought to a cut-off condition in response to this output. In the case where the synchronizing signal has a negative polarity, the reference voltage is preset lower than the emitter voltage of the separating transistor, and the output is produced at the time when the emitter voltage is below the reference voltage. In addition, the total charged quantity and the total discharged quantity of electric charges of the capacitor in one cycle of the composite video signal are equal to each other, and the charging current to the capacitor is chosen sufficiently larger than the discharging current, as described previously.

Accordingly, since the peak level of the synchronizing signal of the composite video signal is substantially fixed to the emitter voltage of the separating transistor as described above, the comparator generates the output signal indicating that the separating transistor is to be turned off, in response to only the noise pulse having larger amplitude than that of the synchronizing signal. As a result, the separating transistor would not respond to the noise pulse having such a large amplitude, and therefore, the noise output causing a disturbance in vertical synchronization and the malfunction of the AFC would not be produced from the separating transistor. In addition, since the peak DC level of the synchronizing signal component becomes substantially equal to the emitter voltage of the separating transistor regardless of the electric field intensity and the video information signal amplitude, the reference voltage to be applied to the comparator can be decided independently of the DC level of the composite video signal. In other words, the amplitude of the noise pulse to be eliminated can be arbitrarily preset. Moreover, in the transistor circuit according to the present invention, the base bias voltage for the separating transistor, the reference voltage to be applied to the comparator and, if desired, the supply voltage to the constant-current source may be fed from a single voltage generator circuit, so that the subject transistor circuit can be realized with a little number of circuit elements and adapted for monolithic integrated circuit.

BRIEF DESCRIPTION OF THE DRAWINGS

The above-mentioned and other objects, features and advantages of the present invention will become more apparent by reference to the following description of the invention taken in conjunction with the accompanying drawings, wherein:

FIG. 1 is a circuit diagram showing a basic circuit construction according to the present invention:

FIG. 2 is a signal waveform diagram appearing in the circuit shown in FIG. 1;

FIG. 3 is a circuit diagram showing one preferred embodiment of the present invention which embodies the basic construction in FIG. 1 in a practical form;

FIG. 4 is a signal waveform diagram appearing under a special condition in the circuit shown in FIG. 3;

DETAILED DESCRIPTION OF THE INVENTION

Figure 5:
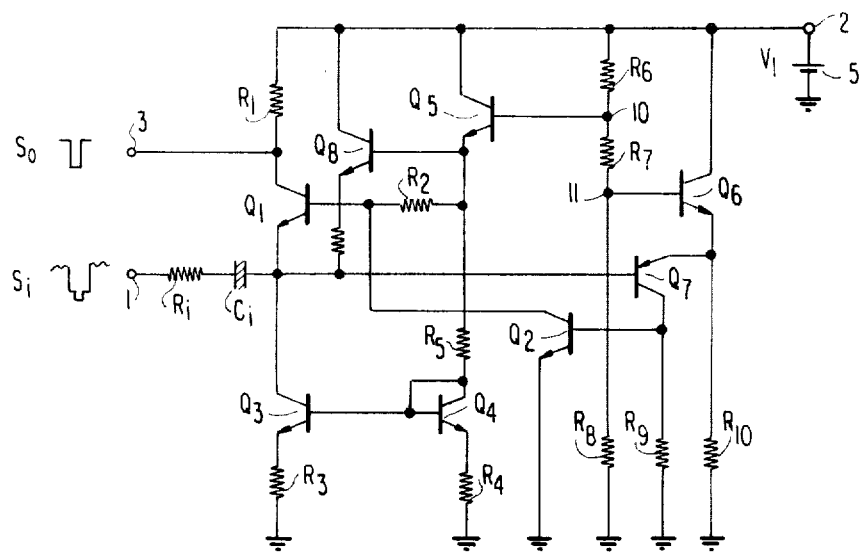
FIG. 5 is a circuit diagram showing another preferred embodiment of the present invention.

Referring now to FIG. 1, a basic circuit construction of the transistor circuit according to the present invention will be explained. To an input terminal 1 is applied a composite video signal $S_i$ containing a synchronizing signal and a video information signal. The input terminal 1 is connected to the emitter of a transistor $Q_1$ for separating a synchronizing signal via a resistor $R_i$ and a capacitor $C_i$ connected in series. The emitter of the transistor $Q_1$ is further grounded via a constant current source 4. The collector of the transistor $Q_1$ is connected to a power supply terminal 2 via a resistor $R_1$ and also connected to an output terminal 3. From this output terminal 3 is derived an output signal $S_o$ in the form of synchronizing pulses. A voltage $V_1$ is applied from a voltage source 5 to the power supply terminal 2. The base of the transistor $Q_1$ is connected through a resistor $R_2$ to a bias voltage source 6 having a voltage $V_2$. The emitter voltage of the transistor $Q_1$ is compared with a voltage $V_3$ of a reference voltage source 8 by a comparator 7. The output of the comparator 7 is applied to the base of a transistor $Q_2$. The emitter of the transistor $Q_2$ is grounded, and its collector is connected to the base of the separating transistor $Q_1$. The voltage $V_2$ of the bias voltage source 6 is preset at such voltage that the separating transistor $Q_1$ can be made conductive only during the period of the synchronizing signal in the composite video signal $S_i$.

In the above-described circuit construction, when the composite video signal $S_i$ is applied to the input terminal 1, the transistor $Q_1$ is turned on by the synchronizing signal and off by the video information signal. A charging current flows from the emitter of the transistor $Q_1$ to the capacitor $C_i$ only during the period of the synchronizing signal. During the remaining period, that is, during the video information signal period, the electric charges in the capacitor $C_i$ are discharged by a constant current $I_o$ flowing through the constant-current source 4. In this charge and discharge process, the total charged quantity and the total discharged quantity of electric charges on the capacitor $C_i$ in one cycle of the composite video signal $S_i$ are equal to each other. In addition, the charging current to the capacitor $C_i$ is sufficiently large as compared to the current $I_o$ flowing through the constant-current source 4. Since the transistor $Q_1$ is made conductive by the synchronizing signal, the peak DC potential of the synchronizing signal becomes substantially equal to the voltage of the voltage $V_2$ of the bias voltage source 6 minus the base-emitter voltage (about 0.7 V) of the transistor $Q_1$. Further the emitter bias voltage of the transistor $Q_1$ is not changed by the composite video signal $S_i$. Consequently, only during the period of the synchronizing signal in the composite video signal $S_i$, a voltage drop occurs across the collector load resistor $R_1$. Thus, an output signal $S_o$ (synchronizing pulse output) separated from the video information signal is derived from the output terminal 3. The resistor $R_i$ is provided for the purpose of regulating the amplitude of the composite video signal by which the synchronizing signal is separated from the other signal. This resistor $R_i$ can be omitted by selecting the proper capacitance of the capacitor $C_i$ and the proper constant current $I_o$.

Signal waveforms of the composite video signal $S_i$ and the output signal $S_o$ are illustrated in FIG. 2. If a noise pulse having a larger amplitude than that of the synchronizing signal is contained in the composite video signal $S_i$ as seen in FIG. 2, the transistor $Q_1$ would respond to this noise pulse to generate a noise output indicated by a dotted line in the output signal $S_o$. However, the comparator 7 and the transistor $Q_2$ eliminate this noise output from the output signal $S_o$. More particularly, as described previously, the transistor $Q_1$ is self-biased so that the emitter voltage which is lower than the voltage $V_2$ of the bias voltage source 6 by the base-emitter voltage (about 0.7 V) of the transistor $Q_1$ may become substantially equal to the peak level of the synchronizing signal in the composite video signal $S_i$. Therefore, the reference voltage $V_3$ of the reference voltage source 8 for the comparator 7 is preset at the following value:

$$V_3 = (V_2 - 0.7) - \Delta V$$

This value $\Delta V$ is determined by taking the fluctuation of the operating points of respective circuit elements into consideration. By selecting such a reference voltage $V_3$, when a noise pulse having a larger amplitude in the negative direction than the peak potential of the synchronizing signal by $\Delta V$ or more is applied, the comparator 7 is actuated to turn on the transistor $Q_2$. By turning on the transistor $Q_2$, the base voltage of the transistor $Q_1$ becomes nearly 0V, so that the transistor $Q_1$ is turned off. As a result, no output would be generated at the collector of the transistor $Q_1$ in response to the noise pulse. Accordingly, the noise signal indicated by a dotted line in FIG. 2 would not be generated. The derived output signal $S_o$ contains only the synchronizing pulses.

As described above, according to the present invention, the generation of the output signal response to the input noise pulse can be prevented. Accordingly, it would never occur that the synchronization is disturbed or self-bias becomes irregular. In addition, the present invention has the advantages that a synchronizing signal separating circuit can control the threshold level for the noise pulse by appropriately selecting the reference voltage $V_3$, and that in the case of the monolithic integrated circuit, the addition of any new external terminal is unnecessary. Therefore, a synchronizing signal separating circuit containing a noise elimination circuit can be realized with slight increase in manufacturing cost as compared to the synchronizing signal separator circuit in the prior art. In other words, an integrated circuit having an excellent cost performance can be provided.

One preferred embodiment of the present invention in which the basic circuit construction shown in FIG. 1 is embodied in a more practical form, is illustrated in FIG. 3. The same functional parts as those included in the basic construction in FIG. 1 are designated by the same reference numerals. The voltages of the bias voltage source 6 and the reference voltage source 8 shown in FIG. 1 are provided by dividing the voltage $V_1$ of the voltage source 5 by a resistance division circuit consisting of resistors $R_6$, $R_7$ and $R_8$. A node 10 between the resistors $R_6$ and $R_7$ is connected to the base of a bias regulating transistor $Q_5$ whose emitter is connected via a resistor $R_2$ to the base of the transistor $Q_1$. A node 11 between the resistors $R_7$ and $R_8$ is connected to the base of a transistor $Q_6$ whose emitter is grounded via a resistor $R_{10}$. The collectors of transistors $Q_5$ and $Q_6$ are connected to the power supply terminal 2. The emitter of the transistor $Q_6$ is further connected to the emitter of a transistor $Q_7$ which forms the comparator 7 shown in FIG. 1. The base of the transistor $Q_7$ is connected to the emitter of the transistor $Q_1$, and the collector of the transistor $Q_7$ is grounded via resistor $R_9$. The collector of the transistor $Q_7$ serves as an output of the comparator 7 (FIG. 1) and hence is connected to the base of the transistor $Q_2$. The emitter of the transistor $Q_5$ is connected via a resistor $R_5$ to an input end of a current mirror circuit which is equivalent to the constant-current source 4 shown in FIG. 1. This current mirror circuit is formed by a diode-connected transistor $Q_4$, a transistor $Q_3$ and resistors $R_3$ and $R_4$. The collector of the transistor $Q_3$ forms an output end of the current mirror circuit and is connected to the emitter of the transistor $Q_1$. Since the transistor $Q_5$ is biased by the voltage at node 10, its emitter current is kept constant. Accordingly, the collector current of the transistor $Q_3$ is proportional to the constant collector current of the transistor $Q_4$, that is to say, the collector current of the transistor $Q_3$ is a constant current.

The voltage at node 10 in the resistance division circuit consisting of the resistors $R_6$, $R_7$ and $R_8$ is selected to be 4.9 V in the illustrated embodiment. Accordingly, the base bias of the transistor $Q_1$ becomes 4.2 V which is equal to the voltage of 4.9 V minus the base-emitter voltage (0.7 V) of the transistor $Q_5$. At the period od synchronizing signal, at the emitter of the transistor $Q_1$ is obtained a voltage of 3.5 V which is derived by further subtracting the base-emitter voltage (0.7 V) of the transistor $Q_1$ from the base bias voltage of 4.2 V. The voltage of 3.5 V is applied to the base of the transistor $Q_7$. To the emitter of the transistor $Q_7$ is applied the voltage of the voltage at the node 11 minus the base-emitter voltage (0.7 V) of the transistor $Q_6$. The voltage at the node 11 is lower than the voltage at the node 10 by the voltage drop across the resistor $R_7$. Accordingly, if the emitter voltage of the transistor $Q_1$ is lowered by a voltage equal to the voltage drop across the resistor $R_7$, the transistor $Q_7$ is forwardly biased and then is turned on. When the transistor $Q_7$ is made conductive, the transistor $Q_2$ is also turned on, so that the transistor $Q_1$ is driven into cut-off condition. In other words, the threshold level at which this noise elimination circuit begins to operate can be determined by the voltage drop across the resistor $R_7$. The voltage drop across the resistor $R_7$ corresponds to the $\Delta V$ appearing in the previous equation. In the illustrated embodiment, the value of $\Delta V$ is chosen to be 0.5 V by taking the fluctuation of circuit element operating points into consideration, and therefore, the voltage at the node 11 is equal to 4.4 V. When an noise pulse having such an amplitude as not reaching the reference voltage $V_3$ (=3 V) is supplied to the input terminal 1, a noise signal may be produced from the output terminal 3. However, such noise pulse does not cause the disturbance of the vertical synchronization or malfunction of the AFC because its amplitude is small.

As described above, the voltage level at which the transistor $Q_7$ begins to conduct can be preset by regulating the resistance of the resistor $R_7$ and/or adjusting the current flowing therethrough. Accordingly, this setting can be achieved very easily. In addition, the voltages $V_2$ and $V_3$ respectively fed by the bias voltage source 6 and the reference voltage source 8 shown in FIG. 1 are both obtained by the resistor division circuit in the embodiment shown in FIG. 3, and moreover the current supply to the current mirror circuit is excuted by the transistor $Q_5$ biased by the voltage from the resistor division circuit. Still further, the comparator 7 is constituted by a single element, that is, the transistor $Q_7$. Accordingly, the circuit shown in FIG. 3 which embodies the basic construction shown in FIG. 1 in a more practical form, requires very few circuit elements. In addition, no additional external terminal is required for the purpose of noise elimination. That is, this circuit construction is quite adapted for a monolithic IC. Incidentally, it is to be noted that the resistor $R_i$ and capacitor $C_i$ are externally mounted parts, because the capacitor $C_i$ requires a large capacitance of, for example, 2.2 $\mu$F and the resistance value of the resistor $R_1$ is to be adjusted in response to the level of the composite video signal.

Two electric paths exist between the node 10 and the emitter of the transistor $Q_1$. One consists of two base-emitter PN-junctions of the transistors $Q_5$ and $Q_1$ and the resistor $R_2$, and the other consists of two base-emitter PN-junctions of the transistors $Q_6$ and $Q_7$ and the resistor $R_7$. Consequently, a temperature coefficient of one electric path is compensated by that of the other electric path. Taking into consideration the fact that the separating transistor $Q_1$ and the comparing transistor $Q_7$ performing important functions are present in these respective paths, it will be seen that the performance of the transistor circuit according to the illustrated embodiment is excellent.

However, under the following particular condition, there exists a possibility of malfunction of the synchronizing signal separating circuit shown in FIG. 3. The particular condition is one which occurs if a power supply voltage of a circuit for generating the composite video signal $S_i$ reaches steady state earlier than that the voltage $V_1$ of the voltage source 5. In other words, this condition is that the composite video signal $S_i$ is applied to the input terminal 1 before the internal bias in the circuit shown in FIG. 3 attains a steady state. This condition may occur, especially in a television set. More particularly, when a power switch of a television set is turned on, at first a horizontal oscillation circuit is actuated. From the output of the horizontal oscillation circuit, a high voltage (5 KV ~ 10 KV) and DC voltages of 12 V, 24 V, etc. are generated by making use of a flyback transformer. These voltages obtained by the flyback transformer serve as practical power supply voltages for a receiver circuit and other signal processing circuits. However, the obtained voltages would contain a considerable ripple component. Therefore, the ripple component is reduced as desired by a smoothing circuit consisting of L, C and R. The smoothing circuit has its own time delay to output a steady state voltage. Consequently, the discrepancy arises between the rise times of the power supply voltages for the respective circuits.

When the above-mentioned condition occurs, the capacitor $C_i$ is charged up to the peak DC level (for instance, 3 V) of the composite video signal $S_i$. Under such condition, if the voltage source 5 rises up to its rated voltage value to generate the voltage of 4.4 V at the node 11, the transistor $Q_7$ is forward biased and becomes conductive. Consequently, the transistor $Q_2$ is also turned on, resulting in cutting the transistor $Q_1$ off. In other words, during the period of the synchronizing signal contained in the composite video signal $S_i$, the transistor $Q_1$ is in its cut-off condition. Therefore, the charge to the capacitor $C_i$ with the emitter current of the transistor $Q_1$ does not excute, so that the emitter voltage of the transistor $Q_1$ is lowered. At the front and back porches of the synchronizing signal, the base voltage of the transistor $Q_7$ is increased via the capacitor $C_i$, and hence the transistor $Q_7$ is turned off. Accordingly, the transistor $Q_2$ is also turned off, so that the transistor $Q_1$ is made conductive to generate the output signal $S_o$ at the output terminal 3. The signal waveforms under the above-mentioned condition are illustrated in FIG. 4. Thus, under the above-described condition, the synchronizing signal cannot be separated.

The above malfunction can be prevented by increasing the charging value to the capacitor $C_i$. A circuit construction which has been improved with respect to the above-mentioned point, is illustrated in FIG. 5. This circuit has a charging circuit for charging the capacitor $C_i$ which is added to the circuit shown in FIG. 3. The charging circuit consists of a transistor $Q_8$ and a resistor $R_{11}$. The base and collector of the transistor $Q_8$ are connected to the emitter of the transistor $Q_5$ and to the power supply terminal 2, respectively, and the emitter of the transistor $Q_8$ is connected via the resistor $R_{11}$ to the emitter of the transistor $Q_1$.

Figure 6:
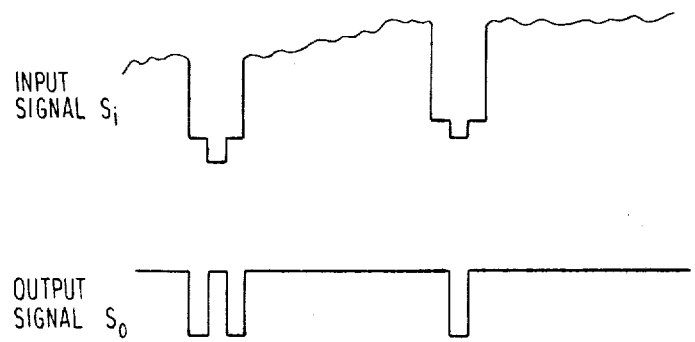
FIG. 6 is a signal waveform diagram appearing in the circuit shown in FIG. 5.

According to the above-mentioned circuit construction, even under the above-described particular condition, since the transistor $Q_8$ is in conductive condition when the emitter voltage of the transistor $Q_1$ is low, its emitter current flows to the capacitor $C_i$ as a charging current. Therefore, the emitter voltage of the transistor $Q_1$ rises gradually. When the emitter voltage of the transistor $Q_1$ reaches the predetermined value, the transistor $Q_8$ is turned off by the resistance difference between the resistor $R_2$ and $R_{11}$ to stop charging the capacitor $C_i$. As a result, the normal operation is recovered so that the peak level of the synchronizing signal in the composite video signal $v_1$ may be fixed substantially to the voltage level lower than the emitter voltage of the transistor $Q_5$ by the base-emitter voltage (about 0.7 V) of the transistor $Q_1$. Accordingly, only the synchronizing signal can be separated from the composite video signal as shown in FIG. 6. It is to be noted that under a steady condition the transistor $Q_8$ is cut off by means of the resistor $R_{11}$. Therefore, error in the bias voltage caused by a surplus charging current would not arise. For that purpose, the resistance of the resistor $R_{11}$ is selected to be larger than that of the resistor $R_2$. For instance, the resistance of the resistor $R_2$ is selected to be 4 K$\Omega$ and the resistance of the resistor $R_{11}$ is selected to be 10 K$\Omega$.

As described in detail above, according to the present invention, there is provided a synchronizing signal separating circuit including a noise elimination circuit which can eliminate noise pulses contained in an input signal and which can reliably separate a synchronizing signal under every operating condition.

It should be noted that the present invention should not be limited to the above-described preferred embodiments. For instance, in the case of handling a composite video signal of positive polarity, the conductivity types of all transistor are interchanged. In this alternative case, it is preferable to ground the terminal 2. In addition, though the comparator 7 and the respective voltage sources 6 and 8 shown in FIG. 1 were practically embodied by the circuit construction illustrated in FIG. 3 in view of reduction of the number of circuit elements and enhancement of the circuit performance, the comparator 7 may be substituted by a well-known differential amplifier, and the voltage sources 6 and 8 could be formed individually, respectively. In addition, various constant current sources disclosed in the above-referred U.S. patent could be used for the constant current source 4.

What is claimed is:

1. A transistor circuit for separating a synchronizing signal from a composite video signal, comprising a transistor having an emitter connected to an input terminal via a capacitor and further connected to a constant-current source, a collector connected to an output terminal from which an output signal corresponding to said synchronizing signal is derived, and a base connected to a bias voltage source, said composite video signal being supplied to said input terminal, a comparator for comparing a voltage at the emitter of said transistor with a predetermined reference voltage, and means responsive to an output signal of said comparator for turning said transistor off.

2. A transistor circuit as claimed in claim 1, wherein said means includes an additional transistor having a base supplied with said output signal of said comparator, a collector connected to the base of said transistor, and an emitter connected to a ground point.

3. A transistor circuit as claimed in claim 2, wherein said predetermined reference voltage is selected to be a voltage value lower than the voltage of said bias voltage source by more than the forward biased base-emitter voltage of said first transistor.

4. A transistor circuit as claimed in claim 2, further comprising means for charging said capacitor when the voltage at the emitter of said transistor is lower than the voltage of said bias voltage of said bias voltage source by more than a forward-biased base-emitter voltage of said transistor.

5. A transistor circuit as claimed in claim 3, further comprising means for charging said capacitor when the voltage at the emitter of said transistor is lower than the voltage of said bias voltage of said bias voltage source by more than a forward-biased base-emitter voltage of said transistor.

6. A transistor circuit as claimed in claim 2, wherein said base of said transistor is connected to said bias voltage source through a resistive element.

7. A transistor circuit as claimed in claim 3, wherein said base of said transistor is connected to said bias voltage source through a resistive element.

8. A transistor circuit as claimed in claim 1, further comprising means for charging said capacitor when the voltage at the emitter of said transistor is lower than the voltage of said bias voltage source by more than a forward-biased base-emitter voltage of said transistor.

9. A transistor circuit as claimed in claim 1, wherein said base of said transistor is connected to said bias voltage source through a resistive element.

10. A transistor circuit for generating a synchronizing pulse corresponding to a synchronizing signal contained in a composite video signal, comprising a transistor having an emitter supplied with said composite video signal through a capacitor, a base applied with a bias voltage, and a collector from which said synchronizing pulse is derived, a comparator for comparing a voltage at said emitter of said transistor with a reference voltage, means responsive to an output signal of said comparator for turning said transistor off, and a charging circuit responsive to the difference voltage between voltages at said emitter and base of said transistor for generating a charging current to said capacitor.

11. A transistor circuit as claimed in claim 10 further comprising a power supply terminal, said charging circuit including an additional transistor having a base supplied with a voltage corresponding to the voltage at said base of said transistor, an emitter connected to said capacitor through a resistor and a collector connected to said power supply terminal.

12. A transistor circuit as claimed in claim 11, wherein said base of said transistor is applied with said bias voltage through a second resistor having a resistance smaller than that of said resistor.

13. A transistor circuit comprising first and second power supply terminals, a first transistor having a collector connected to said first power supply terminal through a load resistor, a constant voltage generator connected between said first and second power supply terminals and having first and second constant voltage output ends, a constant current source connected to an emitter of said first transistor, a base of said first transistor being electrically connected to said first constant voltage output end, an output terminal connected to said collector of said first transistor, an input terminal connected to said emitter of said first transistor through a capacitor, a second transistor serving as a comparator and having a base connected to said emitter of said first transistor and an emitter electrically connected to said second constant voltage output end, and a third transistor having a base connected to a collector of said second transistor, a collector connected to said base of said first transistor and an emitter connected to said second power supply terminal.

14. A transistor circuit as claimed in claim 13, wherein said base of said first transistor is connected to said first constant voltage output end through a resistive element.

15. A transistor circuit as claimed in claim 13, wherein said input terminal is supplied with a composite video signal having a synchronizing signal and a video information signal.

16. A transistor circuit as claimed in claim 15 further comprising a fourth transistor having a base electrically connected to said first constant voltage output end, a collector connected to said first power supply terminal and an emitter connected to said emitter of said first transistor through a resistor.

17. A transistor circuit as claimed in claim 16, wherein said base of said first transistor is connected to said first constant voltage output end through a resistive element having a resistance smaller than that of said resistor.

* * * * *